United States Patent Office 3,641,196
Patented Feb. 8, 1972

3,641,196
STABILIZING POLYACETALS
Bruno Sander, Ludwigshafen (Rhine), Franz Schmidt, Mannheim, and Heinrich Sperber, Ludwigshafen (Rhine), Germany, assignors to Badische Anilin- & Soda-Fabrik Aktiengesellschaft, Ludwigshafen (Rhine), Germany
No Drawing. Filed Apr. 21, 1969, Ser. No. 818,116
Claims priority, application Germany, Apr. 25, 1968, P 17 69 243.2
Int. Cl. C08g 37/32
U.S. Cl. 260—849       13 Claims

ABSTRACT OF THE DISCLOSURE

A process for heat stabilizing polyacetals by adding polycondensates of dicarboxylic diamides, polycarboxylic polyamides containing basic nitrogen, alkylenureas and formaldehyde.

This invention relates to a process for heat stabilizing polyacetals whose recurring units in the main molecular chain consist to the extent of at least 80 mole percent of oxymethylene units.

Known polyacetals of this type include macromolecular polymers of formaldehyde and trioxane, for example those whose terminal hydroxyl groups have been stabilized by chemical reaction such as by etherification or esterification, and particularly macromolecular copolymers of trioxane with from 0.01 to 20 mole percent, especially from 0.1 to 5 mole percent, of the total monomers of copolymerizable compounds which introduce recurring alkylene and particularly oxyalkylene units having at least two and preferably from two to four adjacent carbon atoms into the polymer chain, for example with appropriately constituted cyclic acetals or cyclic ethers, particularly having from three to eight carbon atoms such as ethylene oxide, 1,3-dioxolane, 1,3-dioxane, 2-methoxymethyldioxolane, butanediol-1,4-formal or diglycolformal, or with linear polyacetals having recurring acetal groups in the main molecular chain such as polydioxolanes and particularly polyformals.

It is known that polyacetals of this type can be stabilized against thermal degradation such as may take place in the conventional processing of the polyacetals as thermoplastics, by adding certain organic compounds of nitrogen. Examples of prior art stabilizers are amides, polyamides, urea, thiourea, hydrazines, hydrazides, aromatic nitro compounds or polycondensation products of N,N'-dimethyoldiamides of dicarboxylic acids and cyclic N,N'-alkylenureas.

The effectiveness of prior art stabilizers is however not entirely satisfactory for practical purposes. Moreover, low molecular weight amides and some synthetic polyamides often tend to discolor the polyacetal compositions at elevated temperatures.

It is also known that compounds having an alkaline reaction such as carbonates or hydrogen carbonates of alkali metals may be used as stabilizers for polyacetals either alone or in addition to stabilizers of the above-mentioned types. This method has the disadvantage however that polymer compositions thus stabilized discolor, particularly at the high processing temperatures used (180° to 230° C.).

We have now found that thermoplastic polyacetals whose recurring units of the main molecular chain consist to the extent of at least 80 mole percent of oxymethylene units can be stabilized against the action of heat using up to 5% by weight of the amount of polyacetal of a compound containing an amide group, with or without a conventional antioxidant, while avoiding the said disadvantages, by using as the compound containing an amide group for stabilizing the polyacetal a polycondensate which has been prepared by polycondensation of:

(A) a diamine of a dicarboxylic acid having from four to eighteen carbon atoms;
(B) an amide having at least two amide groups having at least one basic secondary or tertiary nitrogen atom in the molecule;
(C) a N,N'-alkylenurea having from three to ten carbon atoms and/or a N,N'-disubstituted urea having an alkyl, aryl and/or aralkyl radical having from one to eight carbon atoms as substituents; and
(D) formaldehyde in an acid aqueous medium at about 40° to 100° C.

The molar ratio of the components (A), (B) and (C) can be varied within wide limits; the molar ratio of (D) to the sum of the components (A), (B) and (C) should however be from 1:1 to 1.5:1.

The following may be said concerning the polycondensates to be used for the process according to this invention and their components:

Examples of suitable diamides of dicarboxylic acids having from four to eighteen and particularly from five to twelve carbon atoms (component (A)) are the diamides of azelaic acid, sebacic acid, decanedicarboxylic acid or dimethylsuberic acid; adipamide and isophthalamide in particular are very suitable.

Preferred components (B) are amides having at least two and particularly from two to four amide groups and at least one basic secondary or tertiary nitrogen atom in the α- or β-position to at least one amide group in the molecule. Products such as are obtained by reaction of glycidamide with appropriate amounts of ammonia, primary monamines or primary or secondary diamines, particularly with $C_2$–$C_6$-alkylenediamines, with piperazine or with imidazolidine are particularly suitable. The following are given as examples: nitrilotrilactamide, iminodilactamide, ethylenediamine-N,N,N',N'-tetralactamide, hexamethylenediamine-N,N,N',N'-tetralactamide, piperazine-N,N'-lactamide and imidazolidine-1,3-dilactamide. The following are also suitable: nitrilotriacetamide, iminodiacetamide, nitrilotripropionamide, iminodipropanamide, piperazine-N,N'-dipropionamide and imidazolidine-1,3-dipropionamide.

Particularly suitable N,N'-alkylenureas having from three to ten carbon atoms which are preferred as component (C) are N,N'-ethylenurea and N,N'-propylurea, and the alkylene groupings may bear alkoxy, alkyl or hydroxyl groups for example as substituents, such as in the case of 4-methoxy-5,5-dimethyl-N,N'-propyleneurea or 4-hydroxy-5,5-dimethyl-6-isopropyl-N,N'-propylenurea. Particularly suitable N,N'-disubstituted ureas having alkyl, aryl and/or aralkyl radicals having one to eight carbon atoms, particularly hydrocarbon radicals, as substituents are N,N'-dialkylureas such as N,N'-dimethylurea, N,N'-diethylurea or N,N'-dibutylurea, and also N,N'-diarylureas and N,N'-aralkylureas such as N,N'-diphenylurea or N,N'-ditolylurea, and N-alkyl-N'-arylureas such as N-methyl-N'-tolylurea.

Instead of using formaldehyde as component (D) (preferably in aqueous solution) for the production of the polycondensates to be used according to this invention, conventionally employed substances which yield formaldehyde such as paraformaldehyde, trioxane or polyoxymethylene, may be used in appropriate amounts. Naturally it is also possible to use the formaldehyde in the form of N-methylol compounds of components (A) and/or (C) prepared in a preliminary stage.

The amount of formaldehyde (in free or combined form) is advantageously chosen so that the molar ratio of formaldehyde (component (D)) to the sum of components (A), (B) and (C) is from about 1:1 to 1:1.5:1, i.e. about 1 to 1.5 molecules of formaldehyde is present for each two amide groups in the components (A), (B) and (C). In a very suitable embodiment for the production of the polycondensates to be used according to this invention, 1 mole of isophthalamide (A) is polycondensed with about 0.5 to 0.7 mole of component (B), 1 mole of component (C) and from about 2.6 to 2.8 moles of formaldehyde (D). It is preferred to use component (B) in a molar ratio of from 0.2 to 0.8 mole to 2 moles of the sum of the components (A) and (C).

Polycondensation catalysts conventionally used in aminoplast chemistry are suitable as acid polycondensation catalysts in the production of the polycondensates to be used according to this invention, in the conventional amounts, especially mineral acids such as sulfuric acid or phosphoric acid in an amount of from about 0.05 to 0.5% of the weight of components (A), (B), (C) and (D).

After polycondensation in aqueous medium at from about 50° to 100° C., particularly from 80° to 100° C. (which generally is over after about one to three hours) the aqueous polycondensate is advantageously adjusted to a pH of from 7 to 7.5 by adding alkali and thus rendered free from acid. It has proved to be advantageous to separate the polycondensate (which usually separates as a viscous layer containing some water) from the aqueous layer, to add aqueous alkali solution and wash it. When the water-containing polycondensate layer has a high viscosity it is often advantageous to add an organic solvent which is miscible with water such as 1,3-dioxolane or methanol. The polycondensate may be added in the form of such solutions to the polyacetal to be stabilized; usually it is advantageous however previously to isolate the polycondensate in solid form by a conventional method. Isolation of the polycondensate in solid form may take place particularly advantageously by spray-drying solutions or suspensions of acid-free water-containing polycondensate in a heated stream of inert gas, so that the condensate is obtained as a fine powder practically devoid of uncombined formaldehyde and water. Particularly suitable condensates generally have K values of from 14 to 18 and melt at from about 110° to 180° C.

It is of particular advantage also to add to the polyacetals stabilized according to this invention stabilizing amounts, particularly from 0.01 to 2% and preferably from 0.1 to 0.5% by weight of a conventional antioxidant. Phenolic antioxidants such as $C_1$ to $C_4$ alkyl-substituted phenols and alkylenebisphenols, for example 2,2'-methylene-bis-(4-ethyl-6-tert-butylpehnol), 2,6 - ditert-butyl - p - cresol, 2,2' - methylene-bis-(4-methyl - 6 - tert-butylphenol) or 2,2'-butylidene-bis-(4 - methyl-6-tert-butyl-phenol) are preferred. Hydrazones such as benzaldehyde-($\alpha$-N-methyl)-phenylhydrazone, piperonal-($\alpha$ - N-methyl-phenylhydrazone, 3,5-ditert-butyl-4-hydroxybenzaldehyde-($\alpha$-N-methylphenylhydrazone) and mixtures of the said compounds are also very suitable.

Stabilizers to be used according to this invention can be readily incorporated into the polyacetals, either in conventional dry mixers into the powdered polyacetals with or without pigments, fillers, plasticizers, lubricants and the like, or in the solid or dissolved condition into molten polyacetals.

In the case of trioxane copolymers, the stabilizers may be added to the copolymers present as powder or granules after removal of the unstable constituents, for example by hydrolytic or thermal degradation, and then incorporated by melting and homogenization. The stabilizers used according to this invention which are incorporated in amounts of up to 5% by weight, usually from 0.1 to 2% by weight and particularly from 0.1 to 1% by weight into the polyacetals to be stabilized result in particularly good stabilizing effects.

The stabilized polyacetals according to this invention may be repeatedly processed from the melt without becoming discolored. They are particularly suitable for the production of moldings such as are used in industry.

Polyacetals having at least 80 mole percent of oxymethylene (—O—$CH_2$—) units in the main molecular chain which can be stabilized according to this invention include particularly high molecular weight thermoplastic oxymethylene polymers which have been prepared by polymerization of formaldehyde or trioxane and whose terminal groups are protected, for example esterified or etherified, and especially oxymethylene copolymers which (besides 80 to 99.5 mole percent of oxymethylene groups) have 0.5 to 20 and particularly 0.5 to 5 mole percent of alkylene groups and particularly oxyalkylene groups having at least two and particularly from two to four adjacent carbon atoms in the main molecular chain. They may be prepared for example by copolymerization of trioxane with cyclic acetals or ethers having preferably three to eight ring atoms such as ethylene oxide, 1,3-dioxolane, 1,3-dioxane, butanediolformal or diethylene glycolformal, or polyacetals such as polydioxolane, or olefinically unsaturated compounds such as isobutylene or norbornadiene, in the presence of cationic catalysts.

Parts and percentages given hereinafter relate to weight. The K values given have been determined by the method of H. Fikentscher, Cellulosechemie, 13, 58 (1932) in 1% solution in N-methylpyrrolidone at 25° C.

PRODUCTION OF POLYCONDENSATES FOR EXAMPLES 1 TO 4

Condensate (I): 134 parts of isophthalamide (component (A)), 56 parts of nitrilotrilactamide (component (B)) and 96 parts of N,N'-ethyleneurea (component (C)) are added while stirring constantly to a mixture of 200 parts of 30% aqueous formaldehyde (component (D)), 25 parts of water and 5 parts of 10% aqueous sulfuric acid. The molar ratio of (A):(B):(C):(D) is 0.8:0.2:1.0:2.0.

The mixture is heated to from 90° to 95° C. while stirring and condensed for ninety minutes under slight reflux, two liquid layers being slowly formed. After the whole has been cooled, the upper aqueous layer is siphoned off and discarded. The lower condensate layer is stirred with water and, after the freshly formed upper aqueous layer has also been siphoned off, adjusted to a pH value of 7.1 with dilute caustic soda solution. The layer with the condensate contains about 50% of solids and has a viscosity of from 1 to 110 centipoises at 20° C. The polycondensate is recovered in the form of a fine powder from the neutral polycondensate layer by spray drying in a steam of heated inert gas. The polycondensate has a K value of 16 to 17 and melts at from 150° to 155° C.

Condensate (II): Isophthalamide, nitrilotrilactamide, N,N'-ethyleneurea and formaldehyde are reacted as described above in a molar ratio of 0.9:0.3:0.8:2.0. The neutralized layer containing the polycondensate is spray-dried. A colorless powdery product is obtained having a K value of 16.9 and a softening point of from 120° to 140° C.

Condensate (III): Isophthalamide, nitrilotripropionamide, N,N'-ethyleneurea and formaldehyde are condensed in the molar ratio 0.8:0.2:1.0:2.0 as described for the production of condensate (I). A polycondensate having a K value of 15.8 and a softening point of from 130° to 140° C. is obtained from the neutralized layer containing the polycondensate by drying in vacuo.

Similar results are obtained by using N,N'-propyleneurea instead of N,N'-ethyleneurea.

PRODUCTION OF A POLYACETAL CRUDE POLYMER 97 parts of trioxane is polymerized in bulk together with 3 parts of 1,3-dioxolane in the presence of 0.004 part of boron trifluoride etherate as catalyst. The crude polymer (which still contains 18% of volatile constituents, mainly monomers) is powdered.

The following examples will illustrate the invention.

EXAMPLES 1 to 4

The polyacetal crude polymer is intimately mixed in a dry mixer with the amounts specified in the following table of condensates (I), (II) and (III) and the stated amounts of 2,2' - methylene - bis - (4 - methyl - 6 - tert-butylphenol). This mixture is then freed in an extruder from volatile constituents.

The extruded polyacetal resin is tested for colorlessness. The stability of the molding material obtained is measured by determining the loss in weight after heating a sample at 222° C. while passing nitrogen or air over it. The results are given in the following table.

TABLE

| Example | 1 | 2 | 3 | 4 |
|---|---|---|---|---|
| Heat stabilizer: | | | | |
| Condensate | (I) | (I) | (II) | (III) |
| Amount in percent by weight | 0.3 | 0.4 | 0.4 | 0.4 |
| Amount of antioxidant in percent by weight | 0.4 | 0.4 | 0.4 | 0.4 |
| Loss in weight (percent) of a sample after two hours at 222° C. under nitrogen | 0.31 | 0.29 | 0.26 | 0.30 |
| Loss in weight (percent) of a sample after two hours at 222° C. under air | 1.02 | 0.89 | 0.83 | 0.92 |

All the samples are colorless, i.e. without any indication of discoloration, after the stability test by heating for two hours at 222° C. under nitrogen, whereas similar molding material containing as the heat stabilizer dicyandiamine or a commercial copolyamide are discolored yellow brown or brown after the same stability test under nitrogen.

We claim:
1. A process for heat stabilizing thermoplastic polyacetals whose recurring units in the main molecular chain consist to the extent of at least 80 mole percent of oxymethylene (—O—CH$_2$—) units which comprises adding to the polyacetal a stabilizing amount in the range of 0.1 to 5% by weight of the weight of the polyacetal of a polycondensate which has been prepared by polycondensation for about 1-3 hours in an acid aqueous medium at from about 40° to 100° C. of:
   (A) a diamine of a dicarboxylic acid having from four to eighteen carbon atoms;
   (B) an amide having at least two carboxylic amide groups and at least one basic secondary or tertiary nitrogen atom in the molecule;
   (C) an N,N'-alkylenurea having from three to ten carbon atoms and/or a N,N'-disubstituted urea having an alkyl, aryl or aralkyl radical having from one to eight carbon atoms as substituents; and
   (D) formaldehyde, the ratio of the sum of the moles of (A), (B) and (C) to the number of moles of (D) being from 1:1 to 1:1.5 and the molar ratio of (B) to the sum of (A) and (C) being from 0.2:2 to 0.8:2.

2. A process as claimed in claim 1 in which a conventional anti-oxidant is also added.

3. A process as claimed in claim 1 wherein the polycondensate used has been converted into the powdered condition by spray-drying the acid-free water-containing crude condensate.

4. A process as claimed in claim 3 wherein a solvent is added prior to spray-drying.

5. A process as claimed in claim 1 wherein component (A) is adipamide.

6. A process as claimed in claim 1 wherein component (A) is isophthalamide.

7. A process as claimed in claim 1 wherein component (B) is nitrilolactamide.

8. A process as claimed in claim 1 wherein component (C) is N,N'-ethylenurea.

9. A process as claimed in claim 1 wherein component (C) is N,N'-propylenurea.

10. A process as claimed in claim 1 wherein component (D) is an aqueous solution of formaldehyde.

11. A process as claimed in claim 1 wherein component (D) is a substance which will yield formaldehyde.

12. A process as claimed in claim 1 wherein component (A) is isophthalamide and the molar ratio of components (A), (B), (C) and (D) is 1:0.5–0.7:1:2.6–2.8.

13. A process as claimed in claim 1 wherein the molar ratio of component (A) to (C) is from 0.8:1.0 to 0.9:0.8.

References Cited

UNITED STATES PATENTS

| 3,063,960 | 11/1962 | Smith | 260—849 |
| 3,278,470 | 10/1966 | Henshall et al. | 260—849 |

FOREIGN PATENTS

| 1,243,873 | 7/1967 | Germany | 260—849 |
| 1,029,389 | 5/1966 | Great Britain | 260—849 |
| 6412073 | 4/1965 | Netherlands | 260—849 |

JOHN C. BLEUTGE, Primary Examiner

U.S. Cl. X.R.

260—45.8 N, 45.9 P, 67.5, 70 R, 72 R